United States Patent
Kong

(10) Patent No.: US 8,447,926 B2
(45) Date of Patent: May 21, 2013

(54) METHOD OF CONTROLLING OPTICAL DISC DRIVE ARCHIVE SYSTEM

(75) Inventor: Seungpill Kong, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 121 days.

(21) Appl. No.: 13/053,840

(22) Filed: Mar. 22, 2011

(65) Prior Publication Data

US 2011/0238911 A1   Sep. 29, 2011

(30) Foreign Application Priority Data

Mar. 23, 2010  (KR) .................. 10-2010-0025717

(51) Int. Cl.
*G06F 12/00* (2006.01)

(52) U.S. Cl.
USPC .................................. 711/114; 711/E12.103

(58) Field of Classification Search
USPC .......................................................... 711/114
See application file for complete search history.

(56) References Cited

U.S. PATENT DOCUMENTS

| | | | | |
|---|---|---|---|---|
| 5,138,591 A * | 8/1992 | Ogawa et al. | ............... | 369/30.83 |
| 5,255,251 A * | 10/1993 | Fitzgerald et al. | ......... | 369/30.45 |
| 5,781,920 A | 7/1998 | Takagi | | |
| 5,832,200 A | 11/1998 | Yoda | | |
| 5,832,523 A * | 11/1998 | Kanai et al. | ............... | 1/1 |
| 5,875,459 A * | 2/1999 | Taoda | ............... | 711/114 |
| 6,347,359 B1 * | 2/2002 | Smith et al. | ............... | 711/114 |
| 6,625,690 B2 * | 9/2003 | Kamo et al. | ............... | 711/114 |
| 7,032,086 B2 * | 4/2006 | Merchant | ............... | 711/156 |
| 7,035,972 B2 * | 4/2006 | Guha et al. | ............... | 711/114 |
| 7,043,605 B2 * | 5/2006 | Suzuki | ............... | 711/114 |
| 7,124,242 B2 * | 10/2006 | Miki | ............... | 711/112 |
| 7,127,557 B2 * | 10/2006 | Ito et al. | ............... | 711/114 |

OTHER PUBLICATIONS

Tim Fisher, "Profile: Optical Disc Drive", Jun. 6, 2007, pp. 1-3, http://web.archive.org/web/20070606013034/http://pcsupport.about.com/od/componentprofiles/p/p_odd.htm.*
Prepressure, "RAID", Oct. 8, 2007, pp. 1-4, http://web.archive.org/web/20071018033553/http://www.prepressure.com/library/technology/raid.*
PC Guide, "RAID Level 3", Sep. 2, 2000, pp. 1-2, http://web.archive.org/web/20000815220737/http://www.pcguide.com/ref/hdd/perf/raid/levels/single.htm.*
Paul Massiglia, "The RAID Book: A Storage System Technology Handbook", 6th Edition, 1997, pp. 100-137, 198-199, 252-253, 264-265.*

* cited by examiner

*Primary Examiner* — Edward Dudek, Jr.
*Assistant Examiner* — Christopher Birkhimer
(74) *Attorney, Agent, or Firm* — Birch, Stewart, Kolasch & Birch, LLP

(57) ABSTRACT

A method of controlling an ODD archive system comprising three or more ODDs is provided comprising storing information on a parity drive in a memory, and setting a parity drive in which parity data is to be recorded based on the information when data recording is requested in a RAID 3 or 4 manner. The information on the parity drive may include a cumulative value of number of times by which each ODD has been set as the parity drive up to now. Or the information on the parity drive may be managed for each of one or more magazine having optical discs the number of which is equal to or less than the number of ODDs included in the archive system.

10 Claims, 5 Drawing Sheets

Magazine Management Information

| Magazine No. | Disc No. | File Name | Parity Drive No. |
|---|---|---|---|
| Magazine1 | Disc 1~4 | aaa.dat | Drive1 |
| Magazine2 | Disc 5~8 | bbb.dat | Drive2 |
| Magazine3 | Disc 9~12 | ccc.dat | Drive3 |
| Magazine4 | Disc 13~16 | ddd.dat | Drive4 |
| ⋮ | ⋮ | ⋮ | ⋮ |

METHOD OF CONTROLLING OPTICAL DISC DRIVE ARCHIVE SYSTEM

CROSS-REFERENCE TO RELATED APPLICATION

This application claims priority to Korean Patent Application No. 10-2010-0025717 filed on Mar. 23, 2010, the contents of which are herein incorporated by reference in its entirety.

BACKGROUND

1. Technical Field

The present invention relates to a method of controlling an ODD archive system, and more specifically to a method of setting a parity drive in an archive system including optical disc drives.

2. Discussion of the Related Art

RAID ("Redundant Array of Independent Discs) is a technology that distributively stores data in a plurality of hard disc drives (HDDs). RAID levels are divided according to data storing manners. Reliability or entire capability of a storage device may be increased corresponding to each RAID level.

There were five RAID levels originally conceived, but many variations including several nested levels have evolved. RAID combines a plurality of discs into a single logical disc.

RAID 0 uses two or more stripped discs without parity for error detection, and RAID 1 uses two or more mirrored discs without parity. Thus, RAID 0 and RAID 1 provide failure prevention functions in preparation for disc errors or single disc failure.

RAID 3 and RAID 4 use three or more stripped discs with simple parity. For example, in the case of using four discs as shown in FIG. 1, various types of recording-requested data, such as music files, movie files, or document files, are distributively recorded in three discs, and parity is intensively recorded in one remaining disc for error detection.

RAID 5 uses three or more stripped discs in which parities are distributed. For example, in the case of using five discs as shown in FIG. 2, data are distributively recorded in the five discs and parities for error detection are distributed over the five discs. RAID is well known to those of ordinary skill in the art, and thus, further detailed description will be omitted.

Recently, ODD archive systems, such as juke boxes, are commercially available. For reference, a substantial difference between 'archive' and 'back-up' lies in the fact that 'archive' is to store and manage data sources, but 'back-up' stores and manages data copies.

An ODD archive system may include a drive bay having a plurality of ODDs (Optical Disc Drives). For example, in the case of storing data in RAID 3 and 4 in an archive system provided with a drive bay having first to fourth ODDs Drive 1 to 4, the archive system distributively records data in first to third optical discs inserted into the first to third ODDs Drive 1 to 3 and intensively records parity for error detection in fourth optical disc inserted into the fourth ODD Drive 4.

However, in the case where among the first to fourth ODDs, the fourth ODD Drive 4 is only subjected to use as a parity drive, excessive load is exerted to the fourth ODD with high frequency of use, thus sharply lowering durability of the fourth ODD and causing failures to the ODD archive system.

SUMMARY

Exemplary embodiments of the present invention provide a method of increasing reliability of an ODD archive system with reduced likelihood of failure, and a method of preventing a specific ODD from being subjected to continuous use as a parity drive in the ODD archive system.

According to an embodiment of the present invention, there is provided a method of controlling an ODD archive system comprising three or more ODDs, comprising storing information on a parity drive in a memory and setting a parity drive in which parity data is to be recorded based on the information when data recording is requested in a RAID 3 or 4 manner.

According to an embodiment of the present invention, there is provided an apparatus of controlling an ODD archive system comprising a drive bay having three or more ODDs, a magazine unit including one or more magazine containing discs the number of which is equal to or less than the number of ODDs included in the drive bay, and a loader for respectively inserting optical discs of the magazine into the ODDs of the drive bay, the apparatus comprising a memory for storing information on a parity drive, and a controller configured to set a parity drive in which parity data is to be recorded based on the information stored in the memory when data recording is requested in a RAID 3 or 4 manner.

According to an embodiment, the information on the parity drive may include a cumulative value of number of times by which each ODD has been set as the parity drive up to now.

According to an embodiment, the information on the parity drive may be managed for each of one or more magazine having optical discs the number of which is equal to or less than the number of ODDs included in the archive system.

According to an embodiment, an ODD that has been set the least number of times as a parity drive may be set as the parity drive for the recording request based on the information on the parity drive.

According to an embodiment, recording-requested data may be distributively recorded through the other ODDs than the ODD set as the parity drive, and parity data is recorded through the set parity drive.

Therefore, it may be possible to increase durability and data reliability of the ODD archive system.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

Hereinafter, exemplary embodiments of the present invention will be described in more detail with reference to the accompanying drawings.

Figure 1:
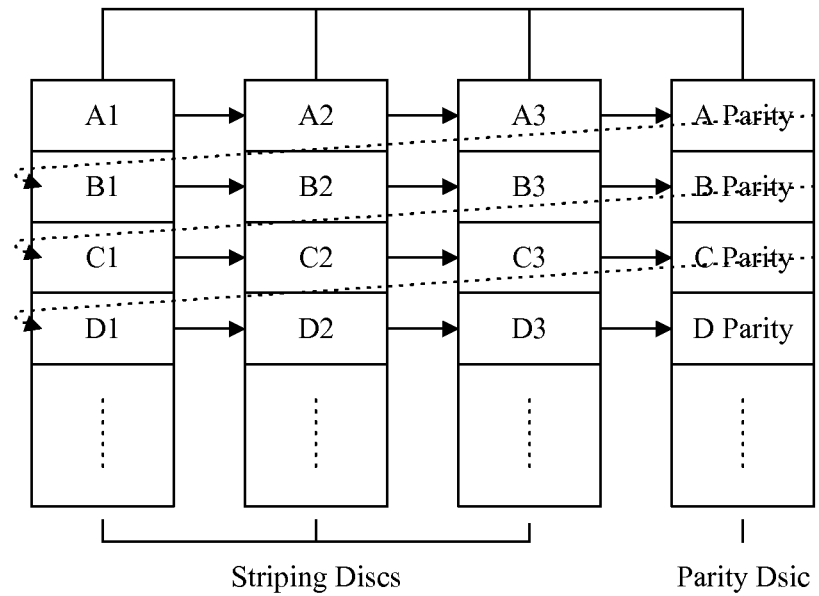
FIG. 1 is a view schematically illustrating RAID 3 and 4.
Figure 2:
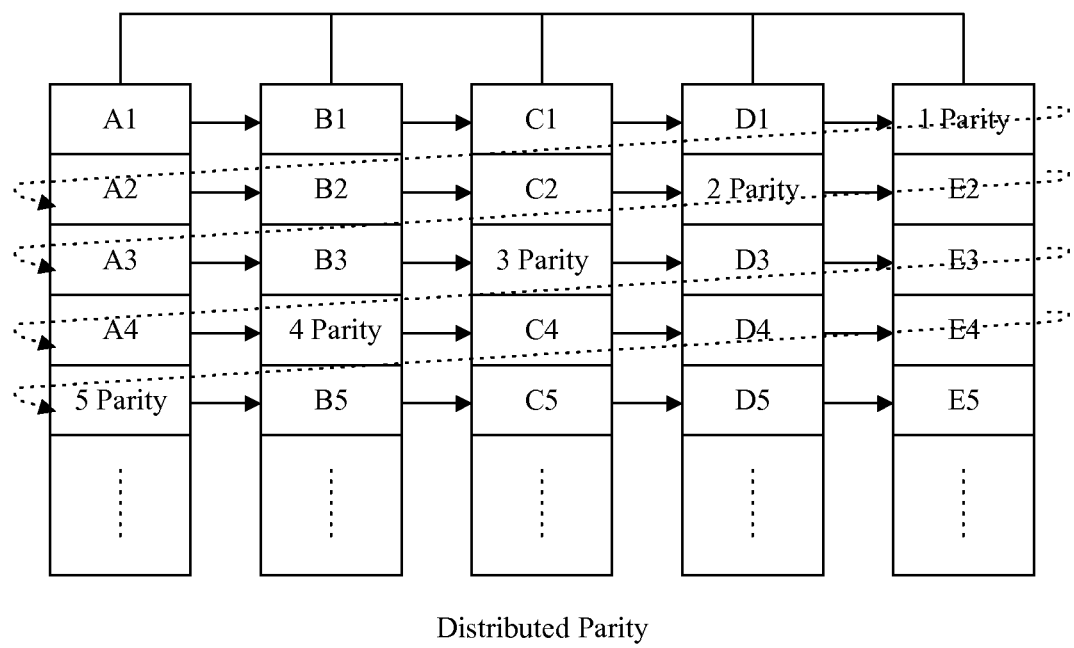
FIG. 2 is a view schematically illustrating RAID 5.
Figures 3, 4:
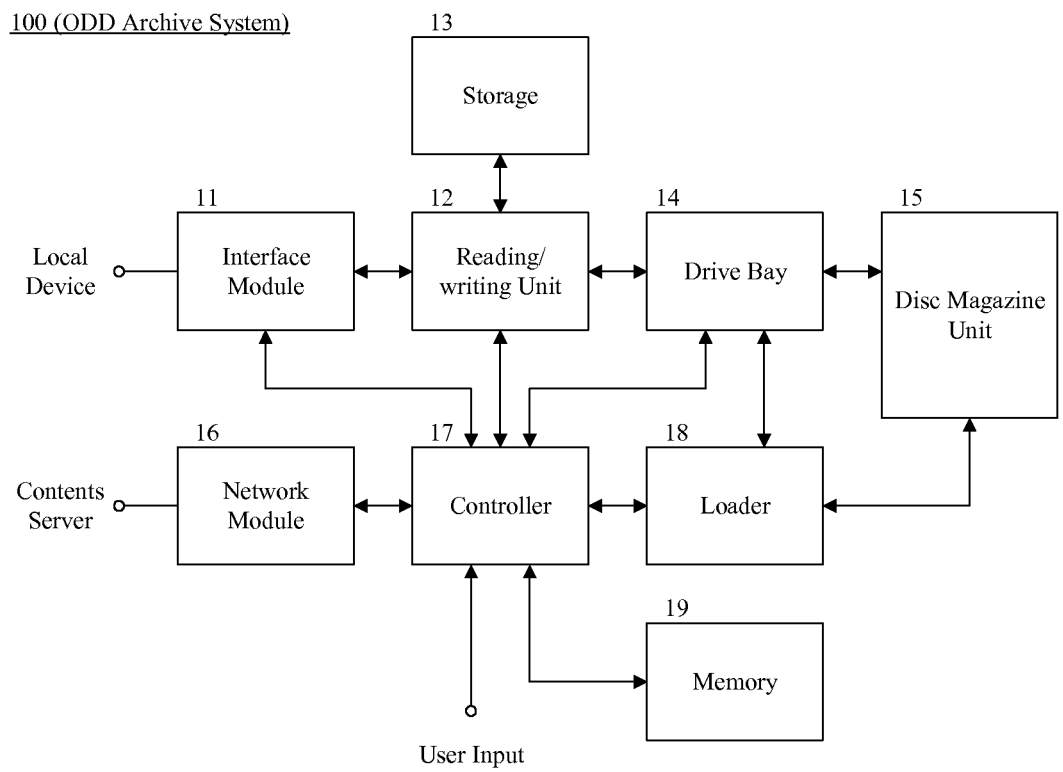
FIG. 3 is a block diagram illustrating a configuration of an ODD archive system according to an embodiment of the present invention.
FIG. 4 is a view illustrating magazine management information managed according to an embodiment of the present invention.

FIG. 3 illustrates a configuration of an ODD archive system according to an embodiment of the present invention. An ODD archive system 100 may include an interface module 11, a reading/writing unit 12, a storage 13, a drive bay 14, a disc magazine unit 15, a network module 16, a controller 17, a loader 18, and a memory 19.

For example, various local devices, such as a personal computer (PC) or a USB memory, may be connected to the interface module 11. A contents server providing various types of contents, such as music files, movie files, or document files, over a network including the Internet, may be connected to the network module 16.

The storage 13 may include, for example, a mass hard disc drive (HDD) (also referred to as "hard disc" throughout the specification according to embodiments). The drive bay 14 may include a plurality of optical disc drives (ODDs), such as, for example, first to fourth ODDs Drive 1 to 4.

The disc magazine unit 15 may include several magazines, each having grouped optical discs the number of which is equal to or less than the number of ODDs included in the drive bay 14. For example, a first magazine Magazine 1 includes grouped first to fourth optical discs Disc 1 to 4, a second magazine Magazine 2 includes grouped fifth to eighth optical discs Disc 5 to 8, a third magazine Magazine 3 includes grouped ninth to twelfth optical discs Disc 9 to 12, and a fourth magazine Magazine 4 includes grouped thirteenth to sixteenth optical discs Disc 13 to 16.

The loader 18 performs a disc loading operation in response to a command from the controller 17. The disc loading operation collectively inserts or ejects the optical discs (for example, Disc 1 to 4) of a magazine (for example, Magazine 1) included in the disc magazine unit 15.

The memory 19 may include a non-volatile memory, such as, for example, a flash memory or EEPROM. The memory 19 stores management information on the several magazines, that is, "magazine management information".

For example, as shown in FIG. 4, all or at least some of a magazine number, a disc number, a file name, and a parity drive number may be stored in the magazine management information in the form of a look-up table in association with one another. The parity drive number is information necessary for evenly determining a parity drive without being biased to a certain drive. The parity drive number may be set by user's selection or automatically by the controller 17. A RAID level may also be stored in the magazine management information.

For example, as shown in FIG. 4, a first optical disc drive Drive 1 is set as a parity drive in the first magazine Magazine 1 having grouped first to fourth discs Disc 1 to 4, a second optical disc drive Drive 2 is set as a parity drive in the second magazine Magazine 2 having grouped fifth to eighth discs Disc 5 to 8, a third optical disc drive Drive 3 is set as a parity drive in the third magazine Magazine 3 having grouped ninth to twelfth discs Disc 9 to 12, and a fourth optical disc drive Drive 4 is set as a parity drive in the fourth magazine Magazine 4 having grouped thirteenth to sixteenth discs Disc 13 to 16.

For example, in response to a user's request, the controller 17 may control the loader 18 to, after inserting optical discs of any magazine included in the disc magazine unit 15 into the drive bay 14, search a parity drive number for a corresponding magazine from the magazine management information, or to, if magazine management information for the corresponding magazine is absent, newly generate magazine management information. In this case, a parity drive may be randomly or sequentially set, or parity drive numbers for other magazines may be identified so that a drive having been set the least number of times as a parity drive may be determined as a parity drive.

The controller 17 may accumulate and manage information on parity drives set up to now in the memory 19. For example, the controller 17 may store a cumulative value as to how many times each ODD has been set as the parity drive in the memory 19 and manage it, and when an optical disc is inserted into each ODD of the drive bay 14 or when data recording is requested in the manner of RAID 3 or 4, may also determine as the parity drive an ODD that has been so far set the least number of times as the parity drive.

The controller 17 controls the storage 13 to record various types of data, such as music files, movie files, or document files, as requested by a user in a number of optical discs in a RAID level determined by the user. For example, in the case of applying RAID 3 and 4, parity is recorded in a disc set as a parity drive and requested data are distributively recorded in the other discs.

Since at least three or more optical discs are required for application of RAID 3 and 4, at least three or more ODDs are provided in the drive bay 14 and at least three or more optical discs are grouped into a magazine.

Figure 5:
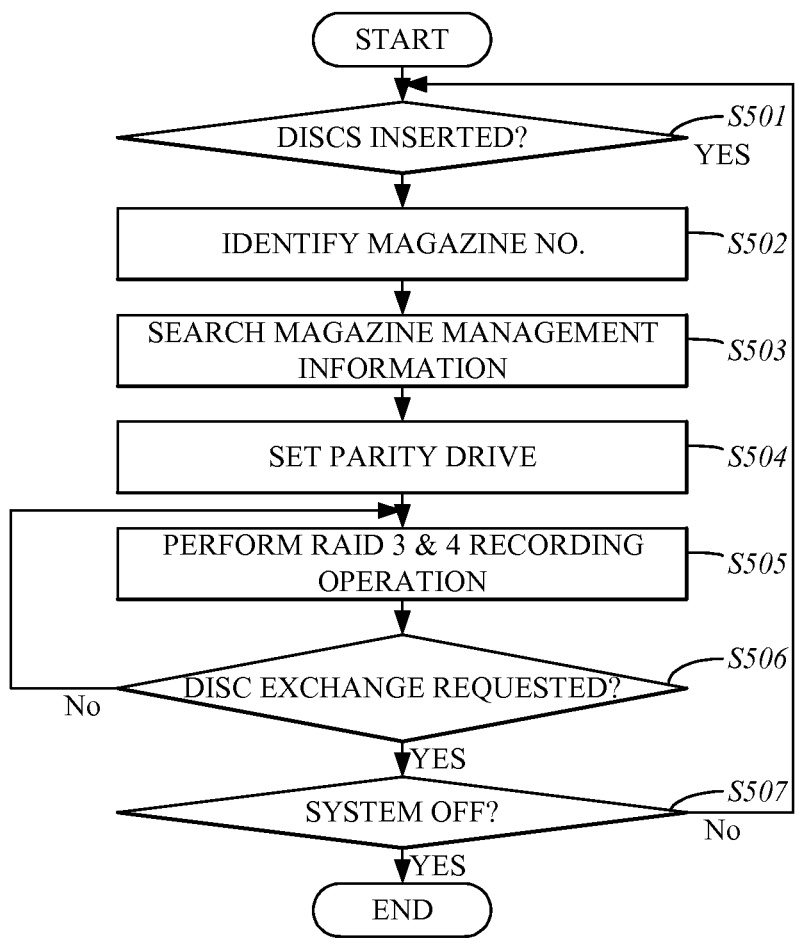
FIG. 5 is a flowchart illustrating a method of controlling an ODD archive system according to an embodiment of the present invention.

FIG. 5 is a flowchart illustrating a method of controlling an ODD system according to an embodiment of the present invention.

Magazine management information is stored in the memory 19 to allow a parity drive to be evenly determined without being biased to a certain drive.

In response to a user's request, the controller 17 controls the loader 18 to select one of a plurality of magazines provided in the disc magazine unit 15 and to respectively insert optical discs of the selected magazine into ODDs included in the drive bay 14 (S501).

Figure 6:
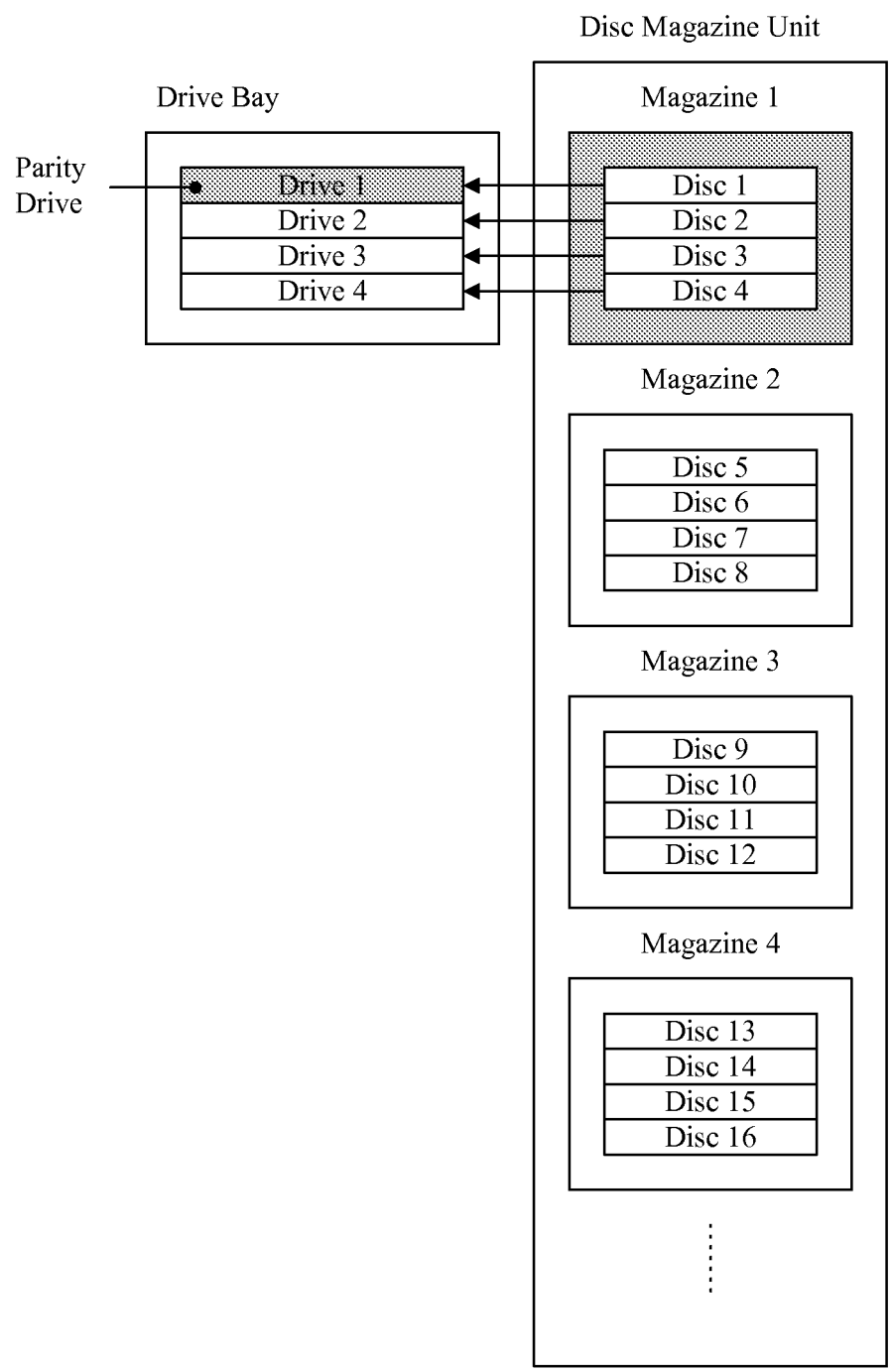
FIGS. 6 and 7 are views illustrating an example where an parity drive is changed according to an embodiment of the present invention.

For example, as shown in FIG. 6, when respectively inserting first to fourth optical discs Disc 1 to 4 grouped into a first magazine Magazine 1 among a plurality of magazines provided in the disc magazine unit 15 into the first to fourth ODDs Drive 1 to 4 (S11), the controller 17 identifies a corresponding magazine number (S502).

And, the controller 17 searches a parity drive number set to the identified magazine number in the magazine management information stored in the memory 19 (S503) and automatically sets an ODD corresponding to the searched parity drive number as a parity drive (S504).

For example, in a case where the first to fourth optical discs grouped into the first magazine are respectively inserted into the first to fourth ODDs of the drive bay, the controller 17 searches the magazine management information to set the first ODD as the parity drive.

Or, in a case where magazine management information for the corresponding magazine is absent in step S13, the controller 17 may randomly set the parity drive or may identify the parity drive numbers of other magazines to newly sets a drive having been set the least number of times as a parity drive as the parity drive and to store it in the magazine management information.

And, the controller 17 controls the reading/writing unit 12 to perform RAID 3 and 4 recording operation (S505). For example, the controller 17 distributively records data provided from a local device through the interface module 11 or various types of data provided from a contents server through the network module 16 in the second to fourth optical discs Disc 2 to 4 inserted in the second to fourth ODDs and records parity in the first optical disc Disc 1 inserted in the first ODD for error detection.

Figure 7:
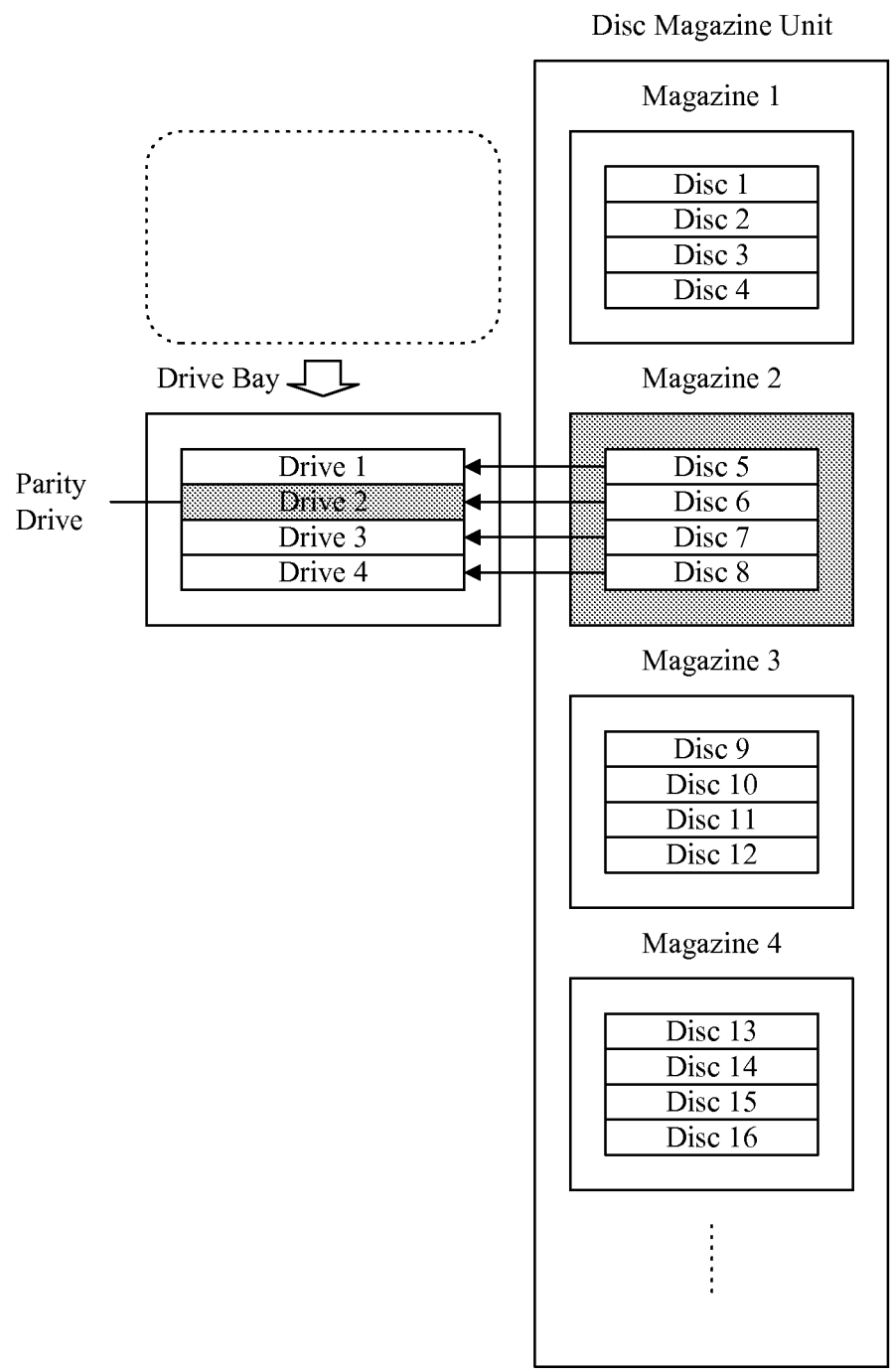

In a case where optical discs need to be exchanged while the RAID 3 and 4 recording operation is performed, or recording operation is complete and disc exchange is requested from a user (S506), the controller 17 ejects the first to fourth optical discs Disc 1 to 4 from the drive bay 14 without system off (S507). Then, as shown in FIG. 7, for example, when the fifth to eighth discs Disc 5 to 8 of the second magazine Magazine 2 are inserted into the drive bay 14, the controller 17 sets the second ODD Drive 2 as the parity drive by referring to the magazine management information or newly generates magazine management information, for example, to set the second ODD Drive 2 as the parity drive.

And, the controller 17 controls the reading/writing unit 12 to perform RAID 3 and 4 recording operation on the discs of the second magazine Magazine 2. In this case, data are distributively recorded in the first, third, and fourth discs Disc 1, 3, and 4 inserted in the first, third, and fourth ODDs of the drive bay 14, and parity is recorded in the second optical disc Disc 2 inserted in the second ODD set as the parity drive for error detection.

That is, when the optical discs Disc 1 to 4 of the first magazine Magazine 1 are inserted in the drive bay 14, the first ODD Drive 1 is set as the parity drive, and when the optical discs Disc 5 to 8 of the second magazine Magazine 2 are inserted in the drive bay 14, the second ODD Drive 2 is set as the parity drive.

Thus, since it can be effectively prevented that only one of the plurality of ODDs in the drive bay is continuously used as the parity drive, it may be possible to increase durability and capability of the ODD archive system.

For reference, the drive bay, the disc magazine unit, and the magazine may also be referred to as other terms, such as, for example, multi-drive, disc cartridge unit, and cartridge, respectively.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method of controlling an Optical Disc Drive (ODD) archive system comprising three or more ODDs, comprising:
    storing information on a parity drive in a memory; and
    setting a parity drive in which parity data is to be recorded based on the information when data recording is requested in a RAID 3 or 4 manner,
    wherein an ODD that has been set a least number of times as a parity drive is set as the parity drive for the recording request based on the information on the parity drive.

2. The method of claim 1, wherein the information on the parity drive includes a cumulative value of number of times by which each ODD has been set as the parity drive.

3. The method of claim 1, wherein the information on the parity drive is managed for each of one or more magazines having optical discs the number of which is equal to or less than the number of ODDs included in the archive system.

4. The method of claim 3, wherein the information on the parity drive includes a magazine number, optical disc numbers included in a corresponding magazine, and a parity drive number set to a corresponding magazine.

5. The method of claim 1, wherein recording-requested data is distributively recorded through other ODDs than the ODD set as the parity drive, and parity data is recorded through the set parity drive.

6. An apparatus of controlling an Optical Disc Drive (ODD) archive system comprising a drive bay having three or more ODDs, a magazine unit including one or more magazines containing discs the number of which is equal to or less than the number of ODDs included in the drive bay, and a loader for respectively inserting optical discs of the magazine into the ODDs of the drive bay, the apparatus comprising:
    a memory for storing information on a parity drive; and
    a controller configured to set a parity drive in which parity data is to be recorded based on the information stored in the memory when data recording is requested in a RAID 3 or 4 manner,
    wherein the controller is configured to set an ODD that has been set a least number of times as a parity drive as the parity drive for the recording request based on the information on the parity drive.

7. The apparatus of claim 6, wherein the information on the parity drive includes a cumulative value of number of times by which each ODD has been set as the parity drive.

8. The apparatus of claim 6, wherein the information on the parity drive is managed for each of the magazines included in the magazine unit.

9. The apparatus of claim 8, wherein the information on the parity drive includes a magazine number, optical disc numbers included in a corresponding magazine, and a parity drive number set to a corresponding magazine.

10. The apparatus of claim 6, wherein the controller is configured to control a RAID recording operation so that recording-requested data is distributively recorded through other ODDs than the ODD set as the parity drive, and parity data is recorded through the set parity drive.

* * * * *